United States Patent
Ramabhadran et al.

(10) Patent No.: US 9,426,854 B1
(45) Date of Patent: Aug. 23, 2016

(54) ELECTRONIC DRIVER FOR CONTROLLING AN ILLUMINATION DEVICE

(71) Applicant: General Electric Company, Schenectady, NY (US)

(72) Inventors: Ramanujam Ramabhadran, Nishayuna, NY (US); Eric Lavigne, Quebec (CA); Michael James Hartman, Clifton Park, NY (US); Danijel Maricic, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/953,451

(22) Filed: Nov. 30, 2015

(51) Int. Cl.
*H05B 33/08* (2006.01)

(52) U.S. Cl.
CPC ........ *H05B 33/0815* (2013.01); *H05B 33/0845* (2013.01)

(58) Field of Classification Search
CPC ........... H05B 33/0815; H05B 33/0839; H05B 33/0842; H05B 33/0818; H05B 41/2828; H05B 41/28; H02M 2001/0048; H02M 2007/4815; H02M 7/523; H02M 7/5387; Y02B 20/185; Y02B 70/1441; Y02B 70/1491; Y02B 70/126; Y02B 70/1433; Y02B 20/204
USPC ............. 315/307, 291, 294, 247, 209 R, 254, 315/246, 312, 219, 244; 363/21.02, 21.1, 363/21.15, 65, 89, 16, 25, 26
See application file for complete search history.

(56) References Cited

U.S. PATENT DOCUMENTS

| | | | |
|---|---|---|---|
| 5,872,429 A | 2/1999 | Xia et al. | |
| 6,356,035 B1 | 3/2002 | Weng | |
| 6,784,867 B1 | 8/2004 | Chang | |
| 7,132,881 B2 * | 11/2006 | Adan | H03H 11/1278 327/337 |
| 8,014,176 B2 * | 9/2011 | Melanson | H01F 3/10 363/21.02 |
| 8,107,825 B2 | 1/2012 | Rajagopal et al. | |
| 8,355,268 B2 * | 1/2013 | Boeke | H02M 3/1582 363/65 |
| 8,525,428 B2 * | 9/2013 | Chen | H02M 3/337 315/209 R |
| 8,658,877 B1 | 2/2014 | Bowser et al. | |
| 8,729,818 B2 | 5/2014 | Zhang et al. | |

(Continued)

OTHER PUBLICATIONS

Zhao et al., "A Dimmable LED Driver for Visible Light Communication (VLC) Based on LLC Resonant DC-DC Converter Operating in Burst Mode", Applied Power Electronics Conference and Exposition (APEC), 2013 Twenty-Eighth Annual IEEE, pp. 2144-2150, Mar. 17-21, 2013, Long Beach, CA.

(Continued)

*Primary Examiner* — Haissa Philogene
(74) *Attorney, Agent, or Firm* — Mary Louise Stanford (57) ABSTRACT

An electronic driver for operating an illumination device is provided. The electronic driver includes a power converter configured to illuminate the illumination device. The power converter includes a switch capacitor circuit configured to perform at least one of a pulse width modulation dimming and a visible light communication using the illumination device. The switch capacitor circuit includes a plurality of split capacitors operatively coupled in series to a second end of a primary winding of a transformer in the power converter and a control switch operatively coupled to the plurality of split capacitors. The power converter also includes a controller operatively coupled to the control switch and is configured to control the control switch to perform at least one of the pulse width modulation dimming and the visible light communication.

20 Claims, 4 Drawing Sheets

(56) References Cited

U.S. PATENT DOCUMENTS

| | | |
|---|---|---|
| 8,836,225 B2 | 9/2014 | Snelten et al. |
| 8,848,399 B2 * | 9/2014 | Sagneri ............... H02M 3/158 363/21.02 |
| 2010/0052568 A1 | 3/2010 | Cohen |
| 2013/0300310 A1 | 11/2013 | Hu |
| 2015/0357912 A1 * | 12/2015 | Perreault ............. H02M 1/4208 363/126 |

OTHER PUBLICATIONS

Teodosescu et al., "Resonant LED Driver With Inherent Constant Current and Power Factor Correction", Electronics Letters (vol. 50, Issue: 15), pp. 1086-1088, Jul. 17, 2014.

* cited by examiner

ELECTRONIC DRIVER FOR CONTROLLING AN ILLUMINATION DEVICE

BACKGROUND

Embodiments of the present specification are related to illumination devices, and more particularly to an electronic driver for controlling the illumination devices.

Electronic drivers are often used to operate illumination devices. The electronic drivers are operatively coupled to the illumination device and control an output of the illumination device. By way of example, electronic drivers are used to dim the illumination device, perform visual light communication, and the like.

The illumination device may be dimmed by employing various approaches such as analog dimming and pulse width modulation dimming. Conventional pulse width modulation dimming approaches employ an electronic driver. In this example, a frequency of the entire electronic driver is altered to perform the pulse width modulation dimming. Similarly, visual light communication may be achieved by altering the frequency of the entire electronic driver. However, such frequent alterations in the frequency of the entire electronic drivers lead to losses and reduced life span of the electronic drivers.

BRIEF DESCRIPTION

In accordance with aspects of the present specification, an electronic driver for operating an illumination device is provided. The electronic driver includes a power converter configured to illuminate the illumination device. The power converter includes a first string, which includes a plurality of switches operatively coupled to each other in a series configuration, a resonant tank circuit operatively coupled to the first string and including a resonant inductor and a blocking capacitor operatively coupled to each other in series, where the resonant inductor is operatively coupled in series to the first string at a first node, a transformer including a primary winding and a secondary winding, where a first end of the primary winding is operatively coupled in series to the blocking capacitor of the resonant tank circuit, a rectifier operatively coupled in series to the secondary winding of the transformer. The electronic driver further includes a switch capacitor circuit configured to perform at least one of a pulse width modulation dimming and a visible light communication using the illumination device and including a plurality of split capacitors operatively coupled in series to a second end of the primary winding of the transformer, a control switch operatively coupled to the plurality of split capacitors, and a controller operatively coupled to the control switch and configured to control the control switch to perform at least one of the pulse width modulation dimming and the visible light communication.

In accordance with another aspect of the present specification, a method for operating an illumination device is provided. The method includes operating a power converter in an electronic driver at a first operating frequency. Also, the method includes operating a switch capacitor circuit in the electronic driver at a second operating frequency. Moreover, the method includes generating a differential power gain based on the second operating frequency using the switch capacitor circuit. The method also includes performing, via the electronic driver, at least one of a pulse width modulation dimming and a visible light communication using the illumination device.

In accordance with yet another aspect of the present specification, a lighting system is provided. The lighting system includes a power source and an illumination device. The system also includes an electronic driver configured to perform at least one of a pulse width modulation dimming and a visible light communication using the illumination device and including a power converter configured to illuminate the illumination device and a switch capacitor circuit configured to generate a differential power gain and perform at least one of the pulse width modulation dimming and the visible light communication using the illumination device based on the differential power gain.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for operating an illumination device are presented. In particular, an electronic driver for operating the illumination device is presented. The exemplary driver provides a low cost and easy implementation that allows pulse width modulated (PWM) dimming and/or visible light communication (VLC) of an illumination device.

Figure 1:
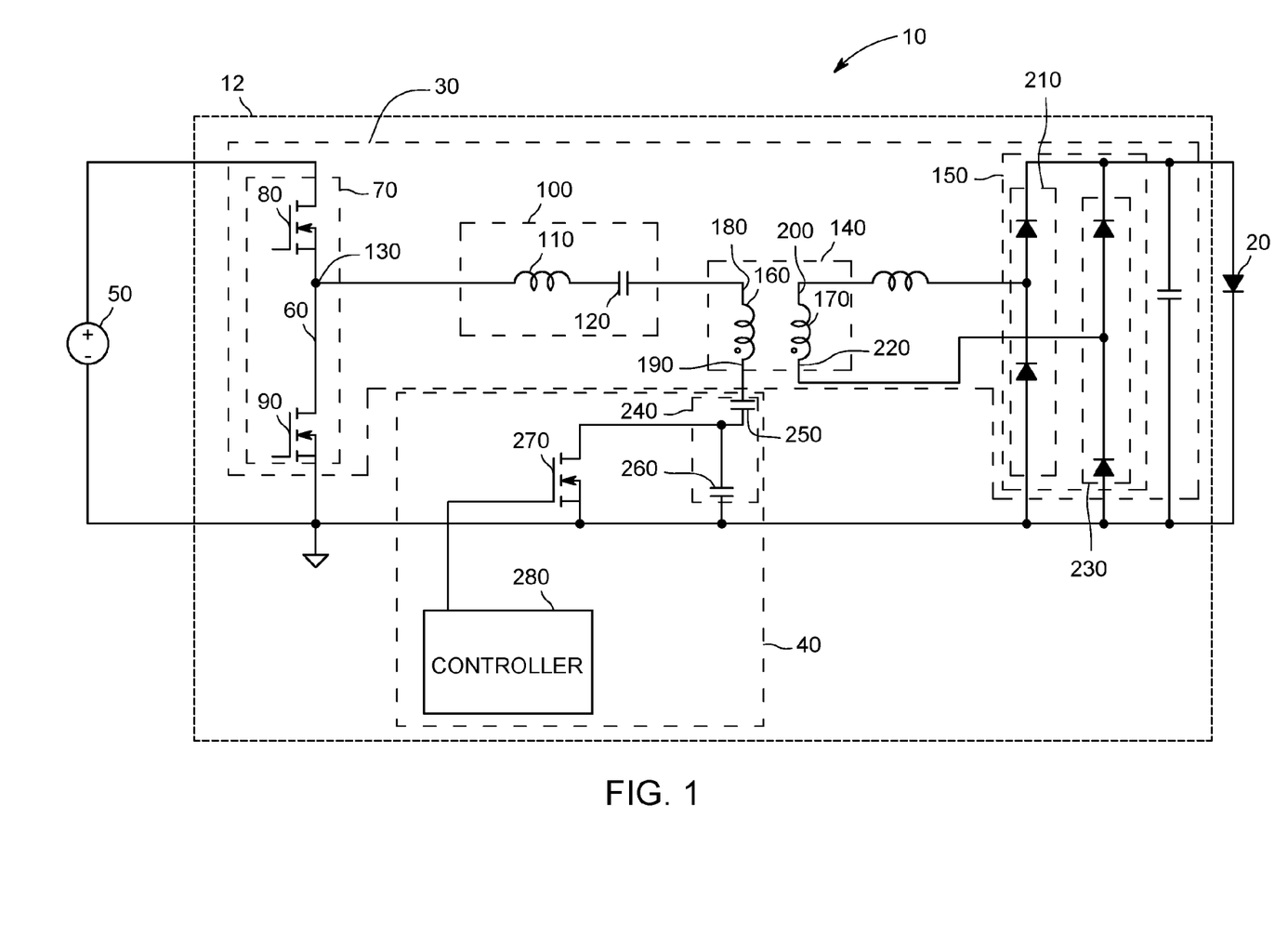
FIG. 1 is a schematic representation of an electronic driver configured to operate an illumination device, according to aspects of the present specification.

FIG. 1 is a schematic representation of an electronic driver 12 configured to operate an illumination device 20, according to aspects of the present specification. The electronic driver 12 includes a power converter 30 and a switch capacitor circuit 40 operatively coupled to each other. The power converter 30 is configured to illuminate the illumination device 20 and the switch capacitor circuit 40 is configured to perform at least one of a pulse width modulation (PWM) dimming and a visible light communication (VLC) using the illumination device 20.

The power converter 30 is operatively coupled to a direct current (DC) power source 50. The power converter 30 receives an input DC power from the DC power source 50. In some embodiments, an alternating current (AC) power source (not shown) may also be used to provide the input DC power. To this end, an input rectifier (not shown) may be operatively coupled between the power converter 30 and the AC power source. The input rectifier converts the AC power received from the AC power source to the input DC power.

Furthermore, the power converter 30 includes a first string 60. In one embodiment, the first string 60 includes a plurality of switches 70 operatively coupled to each other in a series configuration. Also, in certain embodiments, the plurality of switches 70 may include metal oxide field effect transistors (MOSFET) or insulated gate bipolar transistors (IGBTs). In the embodiment depicted in FIG. 1, the plurality of switches may include two switches 80, 90 operatively coupled to each other in a series configuration. Accordingly, in this example, the first string 60 includes the two switches 80, 90 operatively coupled to each other in series. The power converter 30 further includes a resonant tank circuit 100 operatively coupled to the first string 60. The resonant tank circuit 100 includes a resonant inductor 110 and a blocking capacitor 120 operatively coupled in series to each other. Additionally, the resonant inductor 110 is operatively coupled in series to the first string 60 at a first node 130.

In operation, the input DC power having a DC voltage component is fed to the power converter 30. The power converter 30 is operated at a first operating frequency to generate an intermediate AC power from the input DC power. To this end, the two switches 80, 90 are switched based on the first operating frequency in combination with the resonant tank circuit 100 to generate the intermediate AC power from the input DC power. In one embodiment, the power converter 30 may operate in a discontinuous mode of operation. In such embodiments of discontinuous mode of operation of the power converter 30, intermediate AC voltage pulses and intermediate alternating current pulses are generated during the operation of the power converter 30. The values representative of the AC voltage pulses and the alternating current pulses are based on the resonator inductor 110, the blocking capacitor 120, the DC voltage component of the input DC power, and a duty cycle of a determined modulation technique. In one embodiment, the determined modulation technique may include a pulse width modulation technique, which is used for operating the two switches 80, 90. In yet another embodiment, the power converter 30 may operate in a Zero Voltage Switching (ZVS) mode, a Zero Current Switching (ZCS) mode, or a combination thereof Moreover, the power converter 30 includes a transformer 140 that is used to transfer the intermediate AC power generated by the power converter 30 to a rectifier 150 that is operatively coupled to the transformer 140. The transformer 140 includes a primary winding 160 and a secondary winding 170. The primary winding 160 includes a first end 180 and a second end 190, where the first end 180 of the primary winding 160 is operatively coupled in series to the blocking capacitor 120 of the resonant tank circuit 100 and the second end 190 is operatively coupled to the switch capacitor circuit 40. During operation, a current component of the intermediate AC power is transmitted from the first string 60 to the primary winding 160 through the resonant tank circuit 100 via the first end 180 of the primary winding 160. Such a flow of the current component of the intermediate AC power in the primary winding 160 induces a corresponding alternating current in the secondary winding 170 due to the magnetic coupling between the primary winding 160 and the secondary winding 170. In one embodiment, the corresponding alternating current generated in the secondary winding 170 is based on a turns ratio of the transformer 140.

The secondary winding 170 is operatively coupled to the rectifier 150 in the power converter 30. In one embodiment, a first end 200 of the secondary winding 170 is operatively coupled to a first set of diodes 210 in the rectifier 150 and a second end 220 of the secondary winding 170 is operatively coupled to a second set of diodes 230 in the rectifier 150. The corresponding alternating current in the secondary winding 170 is transferred to the rectifier 150. The rectifier 150 converts the alternating current to an output direct current, which is used to drive the illumination device 20 operatively coupled to the power converter 30. In one embodiment, the illumination device 20 may include a light emitting diode (LED).

The electronic driver 12 is also configured to perform at least one of a pulse width modulation (PWM) dimming and a visible light communication (VLC) using the illumination device 20. In accordance with aspects of the present specification, the PWM dimming or the VLC is performed by altering a duty cycle of the illumination device 20 without modifying an average output direct current provided to the illumination device 20 during a corresponding duty cycle. To this end, in one embodiment, the electronic driver 12 employs the switch capacitor circuit 40 to generate a differential power gain. This differential power gain is used to maintain a constant output direct current provided to the illumination device 20, while the duty cycle of the illumination device 20 is being altered.

The switch capacitor circuit 40 includes a plurality of split capacitors 240 such as a first split capacitor 250 and a second split capacitor 260. These split capacitors 250, 260 may be operatively coupled to the second end 190 of the primary winding 160. In one embodiment, the first split capacitor 250 and the second split capacitor 260 may be operatively coupled to the second end 190 of the primary winding 160 in a series combination or a parallel combination. Furthermore, in one embodiment, the first split capacitor 250 and the second split capacitor 260 are chosen based on a determined ratio of capacitance. In a non-limiting example, if a determined ratio of capacitance is thirty, then the first split capacitor 250 having a capacitance value of three nanofarads may be chosen and the second split capacitor 260 having a capacitance value of hundred picofarads may be chosen. It may be noted that any determined ratio of capacitance may be used for selecting the plurality of split capacitors 240. Additionally, any of the plurality of split capacitors 240 may be chosen as the first split capacitor and the second capacitor to maintain the determined ratio of capacitance.

Furthermore, the switch capacitor circuit 40 includes a control switch 270 operatively coupled to the plurality of split capacitors 240. The switch capacitor circuit 40 also includes a controller 280 operatively coupled to the control switch 270. The controller 280 is configured to control gate pulses supplied to the control switch 270 to generate a desired differential power gain, where the differential power gain is used for maintaining the constant output direct current. To this end, the switch capacitor circuit 40 is operated at a second operating frequency, which is different from the first operating frequency of the power converter 30. In one embodiment, the second operating frequency is lower than the first operating frequency and may change over a period of time during operation of the electronic driver 12. It may be noted that the second operating frequency for performing the PWM dimming is different from the second operating frequency for performing the VLC. Consequently, the switch capacitor circuit 40 is configured to perform either one of the PWM dimming or the VLC at any given point in time.

In accordance with aspects of the present specification, the switch capacitor circuit 40 may also be configured to simultaneously perform the VLC and the PWM dimming. In such embodiments, the switch capacitor circuit 40 performs the PWM dimming at a corresponding second operating frequency using a frequency modulation technique and simultaneously uses an amplitude modulation technique such as altering the duty cycle of the switch capacitor circuit 40 to perform the VLC, while operating at the second operating frequency corresponding to the PWM dimming.

The controller 280 generates the gate pulses based on the second operating frequency. The gate pulses that are supplied to the control switch 270 allow the control switch 270 to switch between a non-conducting state and a conducting state. During a first time interval where the control switch 270 is in a non-conducting state, the current component of the AC power flows through the primary winding 160 to the first split capacitor 250 and the second split capacitor 260. Therefore, the total capacitance of the electronic driver 12 during to the first time interval is a sum of the first split capacitor 250 and the second split capacitor 260. However, during a second time interval where the control switch 270 is in a conducting state, the current component of the AC power flows through the primary winding 160 to only the first split capacitor 250. Therefore, the total capacitance of the electronic driver 12 during the second time interval includes only capacitance of the first split capacitor 250. Thus, the total capacitance of the electronic driver 12 in the first time interval is greater than the total capacitance of the electronic driver 12 corresponding to the second time interval. As a result, at a constant voltage, the output DC power corresponding to the first time interval will be higher than the output DC power generated during the second time interval. This difference in the output DC power corresponding to the first and second time intervals generates the differential power gain in the electronic driver 12.

Furthermore, the second operating frequency of the switch capacitor circuit 40 is chosen such that the differential power gain generated by the switch capacitor circuit 40 may be used to increase a peak output direct current within a corresponding duty cycle of the illumination device 20. This increase in the peak output direct current within the corresponding duty cycle aids in maintaining the constant output direct current even when the duty cycle of the illumination device is modified. In some embodiments, the constant output direct current may have a value in a range from about one hundred milliamperes to about two amperes. Therefore, in scenarios where the duty cycle is modified to perform PWM dimming or the VLC, the output direct current is not affected. Consequently, the illumination of the illumination device 20 may be maintained at a constant level.

Figure 2:
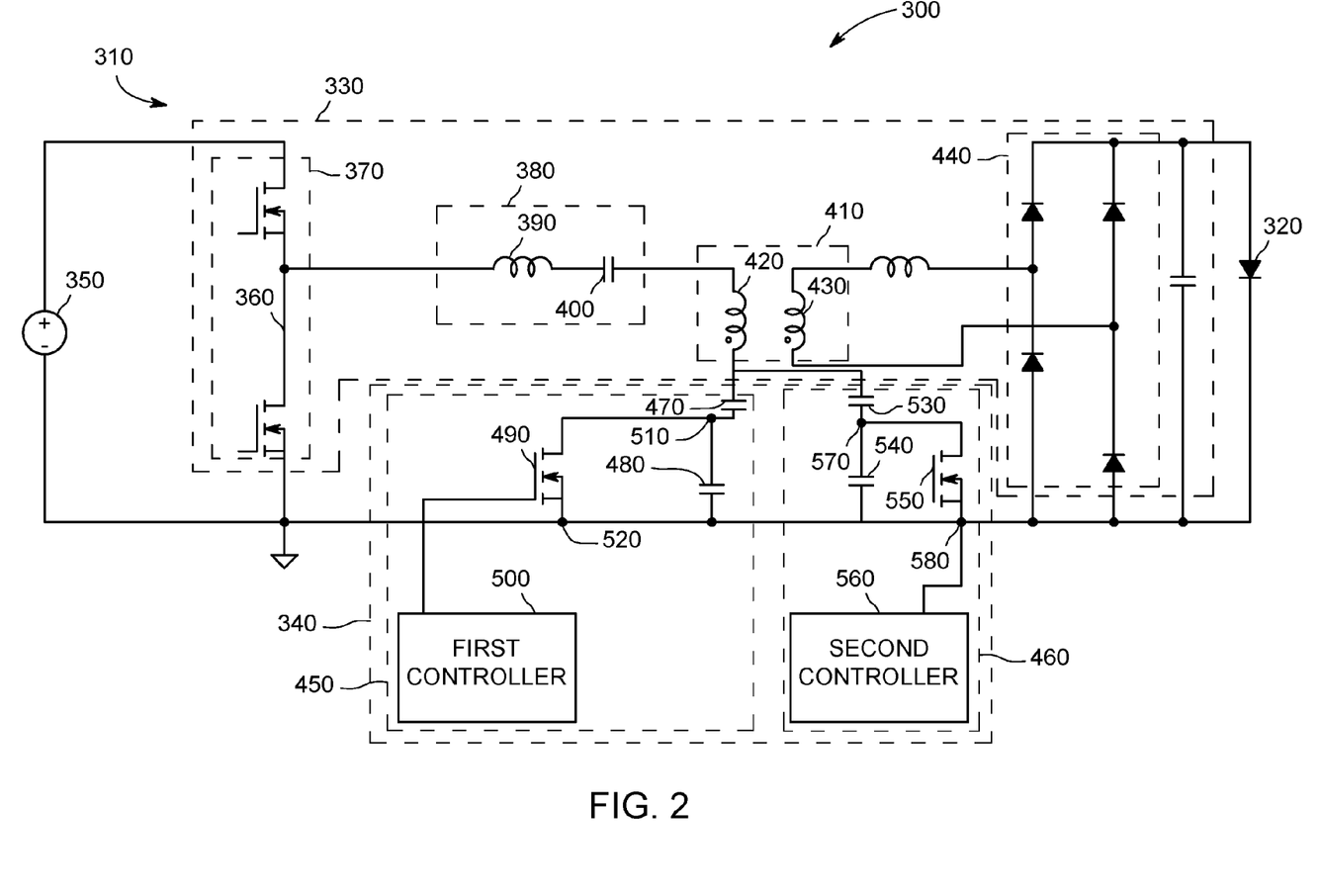
FIG. 2 is a schematic representation of another embodiment of an electronic driver configured to operate the illumination device, according to aspects of the present specification.

Referring now to FIG. 2, a schematic representation 300 of another embodiment of an electronic driver 310 configured to operate the illumination device 320, according to aspects of the present specification, is presented. The electronic driver 310 includes a power converter 330 and a switch capacitor circuit 340. The power converter 330 may be substantially similar to the power converter 30 of FIG. 1. Also, the power converter 330 is operatively coupled to a power source 350. The power converter 330 includes a first string 360 including a plurality of switches 370. Further, the power converter 330 also includes a resonant tank circuit 380 including a resonant inductor 390 and a blocking capacitor 400. Moreover, the power converter 330 also includes a transformer 410 including a primary winding 420 and a secondary winding 430. The power converter 330 further includes a rectifier 440. Also, the secondary winding 430 is operatively coupled to the rectifier 440 in a manner that is substantially similar to the coupling discussed with reference to FIG. 1. It may be noted that in one embodiment, the various components of the power converter 300 may be substantially similar to corresponding components in the power converter 10 of FIG. 1.

In the embodiment of FIG. 2, the switch capacitor circuit 340 is configured to simultaneously perform PWM dimming and VLC. To this end, the switch capacitor circuit 340 includes a first switch capacitor sub-circuit (FSCS) 450 configured to perform the PWM dimming. In addition, the switch capacitor circuit 340 includes a second switch capacitor sub-circuit (SSCS) 460 configured to perform VLC simultaneously with the PWM dimming. In one embodiment, the FSCS 450 and the SSCS 460 may be operated synchronously. It may be noted that in certain embodiments, the second operating frequency of the FSCS 450 for performing PWM dimming is different from the second operating frequency of the SSCS 460 for performing PWM dimming. However, in another embodiment, the FSCS 450 and the SSCS 460 may be synchronously operated at the same second operating frequency of the switch capacitor circuit 340.

Each of the FSCS 450 and the SSCS 460 is substantially similar to the switch capacitor circuit 40 of FIG. 1. The FSCS 450 includes a first split capacitor 470, a second split capacitor 480, a first control switch 490, and a first controller 500. Furthermore, the first control switch 490 is operatively coupled to the first split capacitor 470 and the second split capacitor 480 at a second node 510 and a third node 520 respectively. In one embodiment, the first split capacitor 470 and the second split capacitor 480 have a determined first ratio of capacitance. The first controller 500 is configured to control supply of gate pulses provided to the first control switch 490. The first control switch 490 is configured to transition the coupling of the power converter 330 between the first split capacitor 470 and the second split capacitor 480. This transitioning between the first split resonator capacitor 470 and the second split capacitor 480 of the power converter 330 generates a first differential power gain. The first differential power gain is used to perform the PWM dimming.

The SSCS 460 includes a third split capacitor 530, a fourth split capacitor 540, a second control switch 550, and a second controller 560. Furthermore, the second control switch 550 is operatively coupled to the third split capacitor 530 and the fourth split capacitor 540 at a fourth node 570 and a fifth node 580 respectively. In one embodiment, the third split capacitor 530 and the fourth split capacitor 540 have a determined second ratio of capacitance. Moreover, the second controller 560 is configured to control supply of gate pulses provided to the second control switch 550. The second control switch 550 is configured to transition the coupling of the power converter 330 between the third split capacitor 530 and the fourth split capacitor 540. This transitioning between the third split resonator capacitor 530 and the fourth split capacitor 540 generates a second differential power gain. The second differential power gain is used to perform the VLC.

Figure 3:
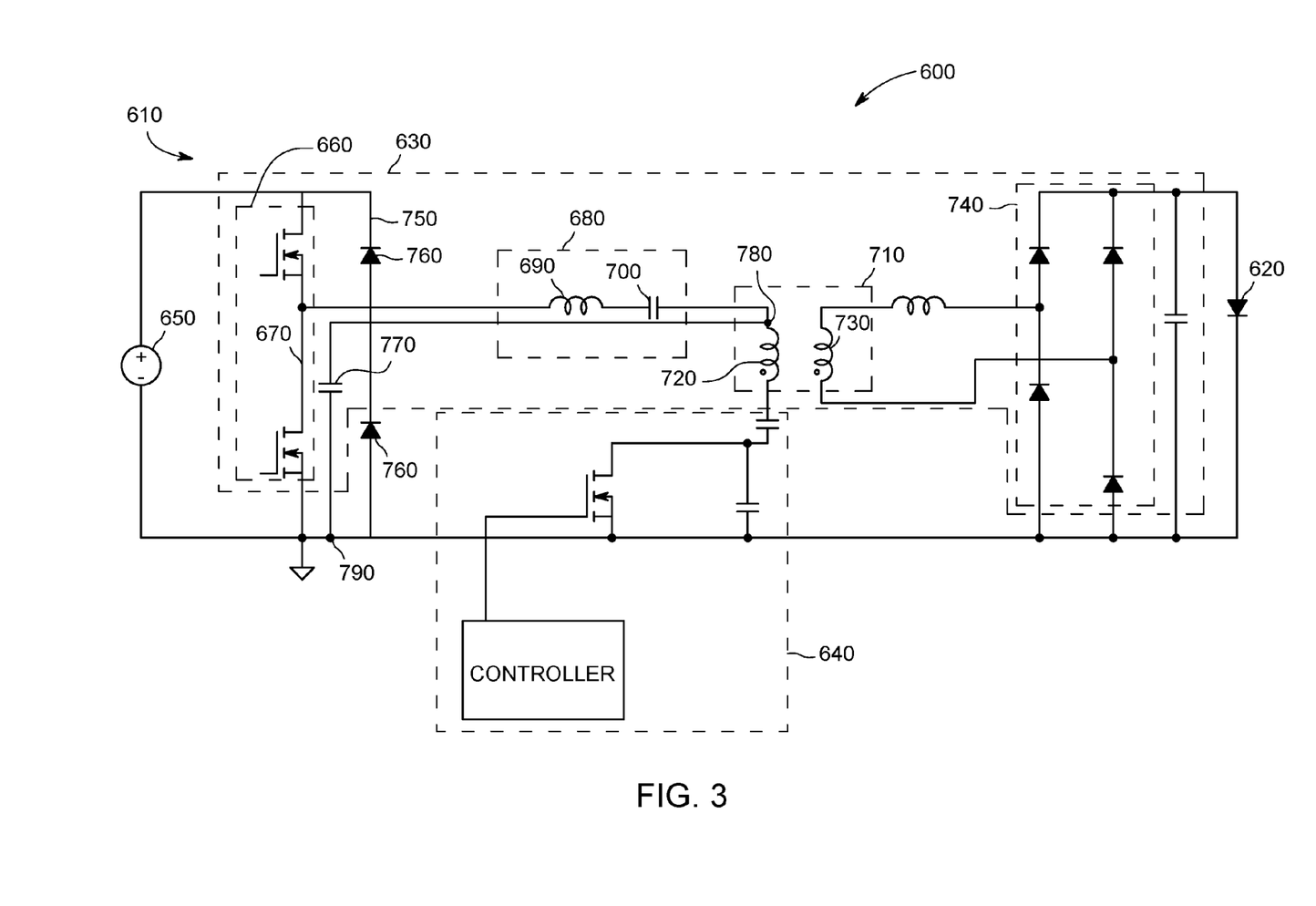
FIG. 3 is a schematic representation of yet another embodiment of an electronic driver configured to operate the illumination device, according to aspects of the present specification.

Turning to FIG. 3, a schematic representation 600 of another embodiment of an electronic driver 610 configured to operate the illumination device 620, according to aspects of the present specification, is presented. The electronic driver 610 includes a power converter 630 and a switch capacitor circuit 640. The power converter 630 may be substantially similar to the power converter 30 of FIG. 1. Also, it may be noted that in one embodiment, the various components of the power converter 600 may be substantially similar to corresponding components in the power converter 10 of FIG. 1.

The power converter 630 is operatively coupled to a power source 650. Moreover, the power converter 630 includes a first string 660 including a plurality of switches 670. The power converter 630 also includes a resonant tank circuit 680 including a resonant inductor 690 and a blocking capacitor 700. The power converter 630 also includes a transformer 710 having a primary winding 720 and a secondary winding 730. The power converter 630 further includes a rectifier. The secondary winding 730 is operatively coupled to the rectifier 740 in a manner that is substantially similar to the coupling discussed with reference to FIG. 1.

Moreover, the switch capacitor circuit 640 is configured to perform at least one of the PWM dimming and the VLC. In the embodiment of FIG. 3, the power converter 630 includes a second string 750 operatively coupled to the first string 660 in a parallel configuration. The second string 750 includes a plurality of diodes 760 operatively coupled to each other in a series configuration. Furthermore, a clamped capacitor 770 is operatively coupled between a sixth node 780 and a seventh node 790. The sixth node 780 is located between the resonant tank circuit 680 and the primary winding 720, and the seventh node 790 is located between the first string 660 and the second string 750. In one embodiment, the power converter 630 may be a diode clamped resonant converter. Furthermore, in certain embodiments, the electronic driver 610 may also be modified as discussed with reference to FIG. 2 to simultaneously perform the PWM dimming and the VLC.

Figure 4:
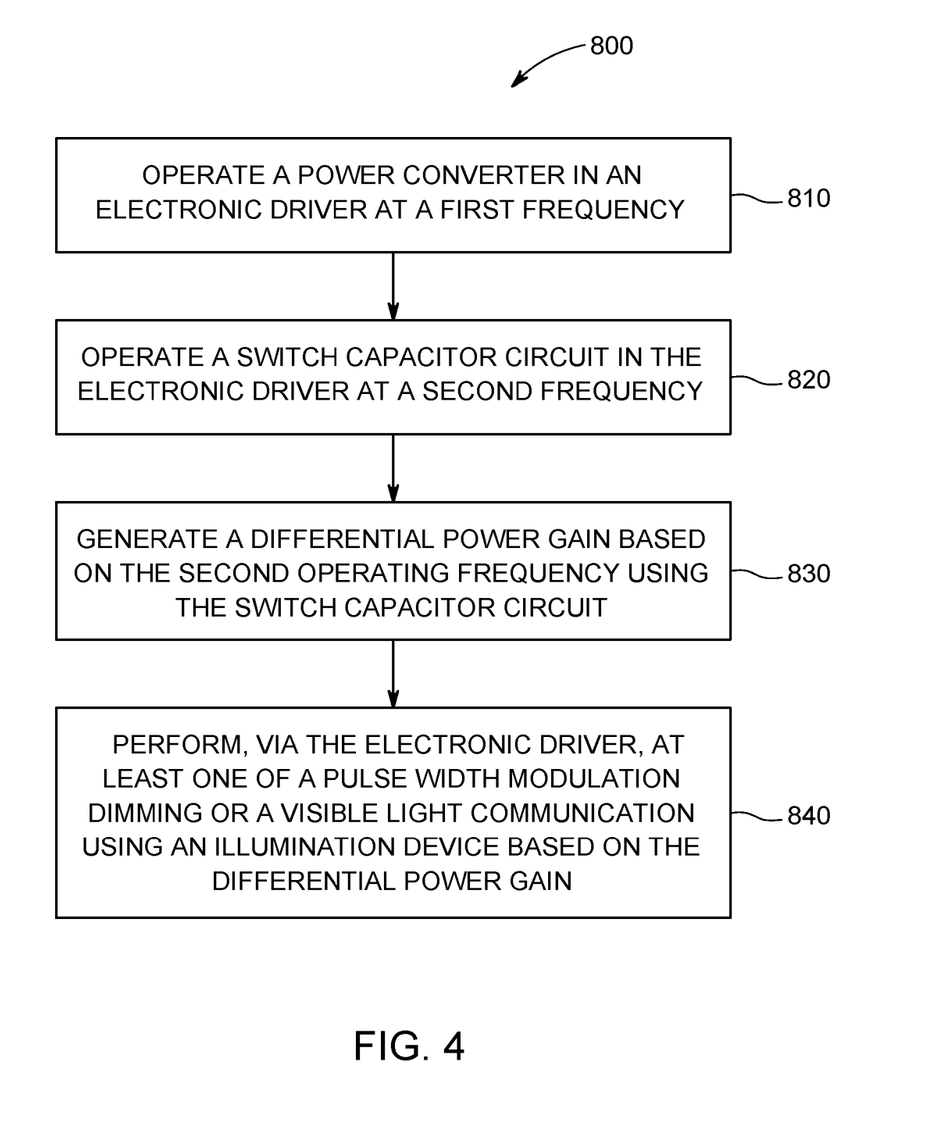
FIG. 4 is a flow chart representing a method for operating an illumination device, according to aspects of the present specification.

FIG. 4 is a flow chart representing a method 800 for operating an illumination device, according to aspects of the present specification. The method 800 is described with reference to the components of FIGS. 1-3. As previously noted, the electronic driver 12 is configured to operate the illumination device 20. Further, the electronic driver 12 includes the power converter 30 and the switch capacitor circuit 40. In particular, the electronic driver 12 is configured to illuminate the illumination device 20 and the switch capacitor circuit 40 is configured to perform at least one of a pulse width modulation (PWM) dimming and a visible light communication (VLC) using the illumination device 20.

The method 800 includes operating a power converter, such as the power converter 30 in an electronic driver 12 at a first operating frequency, as indicated by step 810. In one embodiment, the power converter 30 in the electronic driver 12 is operated at the first operating frequency to illuminate an illumination device such as the illumination device 20.

Further, as depicted by step 820, a switch capacitor circuit such as the switch capacitor circuit 40 in the electronic driver 12 is operated at a second operating frequency. In one embodiment, the switch capacitor circuit 40 may in turn include first and second switch capacitor sub-circuits such as FSCS 340 and SSCS 350. In this example, the first and second switch capacitor sub-circuits 340, 350 may be operated at the second operating frequency.

Subsequently, at step 830, a differential power gain may be generated. In certain embodiments, the differential power gain may be generated based on the second operating frequency via use of the switch capacitor circuit. In one embodiment, the differential power gain is used to maintain a constant level of output direct current, while a duty cycle of the illumination device is altered. In another embodiment, a first differential power gain is generated by a first switch capacitor sub-circuit at the second operating frequency and a second differential power gain is generated by a second switch capacitor sub-circuit at the second operating frequency.

Furthermore, as indicated by step 840, at least one of the PWM dimming and VLC may be performed using the illumination device. In particular, the PWM dimming and/or the VLC may be performed using an electronic driver based on the differential power gain. Also, in one embodiment, PWM dimming and VLC may be performed simultaneously. In this example, the first differential power gain is used to perform the PWM dimming and the second differential power gain is used to perform the VLC simultaneously.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this specification. It is, therefore, to be understood that the appended claims are intended to cover all such modifications and changes as fall within the true spirit of the invention.

The exemplary embodiments of the electronic driver and the method described hereinabove aid in operating the electronic driver at higher duty cycles, while maintaining an average output current. In addition, the systems and methods allow modulation of the light either by PWM dimming or VLC that is independent of the main dimming circuit. Also, use of the exemplary switch capacitor circuit provides a flexible interface to the existing electronic drivers. In particular, the exemplary electronic driver provides an inexpensive and versatile retrofit solution for implementing PWM dimming and VLC in the existing drivers. The use of the exemplary switch capacitor circuit increases operating life of the electronic drivers, and reduces cost of maintenance of the electronic drivers.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electronic driver for operating an illumination device, comprising:
a power converter configured to illuminate the illumination device and comprising:
a first string comprising a plurality of switches operatively coupled to each other in a series configuration;
a resonant tank circuit operatively coupled to the first string and comprising a resonant inductor and a blocking capacitor operatively coupled to each other in series, wherein the resonant inductor is operatively coupled in series to the first string at a first node;
a transformer comprising a primary winding and a secondary winding, wherein a first end of the primary winding is operatively coupled in series to the blocking capacitor of the resonant tank circuit;
a rectifier operatively coupled in series to the secondary winding of the transformer;
a switch capacitor circuit configured to perform at least one of a pulse width modulation dimming and a visible light communication using the illumination device and comprising:
a plurality of split capacitors operatively coupled to a second end of the primary winding of the transformer;
a control switch operatively coupled to the plurality of split capacitors; and
a controller operatively coupled to the control switch and configured to control the control switch to perform at least one of the pulse width modulation dimming and the visible light communication.

2. The electronic driver of claim 1, wherein the switch capacitor circuit further comprises a first switch capacitor sub-circuit and a second switch capacitor sub-circuit, wherein the first switch capacitor sub-circuit is configured to perform the pulse width modulation dimming and the second switch capacitor sub-circuit is configured to perform the visible light communication, and wherein the first switch capacitor sub-circuit and the second switch capacitor sub-circuit are configured to simultaneously perform the pulse width modulation dimming and the visible light communication.

3. The electronic driver of claim 2, wherein the first switch capacitor sub-circuit comprises a first split capacitor, a second split capacitor, a first control switch, and a first controller, and wherein the first control switch is operatively coupled to the first split capacitor and the second split capacitor at a second node and a third node respectively.

4. The electronic driver of claim 3, wherein the first split capacitor and the second split capacitor have a determined first ratio of capacitance.

5. The electronic driver of claim 3, wherein the first controller is configured to control the first control switch to perform the pulse width modulation dimming based on a first differential power gain generated by the first split capacitor and the second split capacitor.

6. The electronic driver of claim 2, wherein the second switch capacitor sub-circuit comprises a third split capacitor, a fourth split capacitor, a second control switch, and a second controller, and wherein the second control switch is operatively coupled to the third split capacitor and the fourth split capacitor at a fourth node and a fifth node respectively.

7. The electronic driver of claim 6, wherein the third split capacitor and the fourth split capacitor have a determined second ratio of capacitance.

8. The electronic driver of claim 6, wherein the second controller is configured to control the second control switch to perform the visible light communication based on a second differential power gain generated by the third split capacitor and the fourth split capacitor.

9. The electronic driver of claim 1, further comprising a second string operatively coupled to the first string in a parallel configuration, wherein the second string comprises a plurality of diodes operatively coupled to each other in a series configuration.

10. The electronic driver of claim 9, further comprising a clamped capacitor operatively coupled between a sixth node and a seventh node, wherein the sixth node is located between the resonant tank circuit and the primary winding of the transformer, and wherein the seventh node is located between the first string and the second string.

11. The electronic driver of claim 1, wherein the first string is operatively coupled to a direct current power source.

12. The electronic driver of claim 1, wherein the rectifier is operatively coupled to the illumination device.

13. The electronic driver of claim 1, wherein the illumination device comprises a light emitting diode.

14. The electronic driver of claim 1, wherein the plurality of switches comprises metal oxide semiconductor field effect transistors or insulated gate bipolar transistors.

15. A method for operating an illumination device, comprising:
   operating a power converter in an electronic driver at a first operating frequency to illuminate the illumination device;
   operating a switch capacitor circuit in the electronic driver at a second operating frequency;
   generating a differential power gain based on the second operating frequency using the switch capacitor circuit; and
   performing, via the electronic driver, at least one of a pulse width modulation dimming and a visible light communication using the illumination device based on the differential power gain.

16. The method of claim 15, wherein operating the switch capacitor circuit further comprises operating a first switch capacitor sub-circuit and a second switch capacitor sub-circuit in the switch capacitor circuit at the second operating frequency.

17. The method of claim 16, wherein generating the differential power gain comprises generating a first differential power gain using the first switch capacitor sub-circuit operating at the second operating frequency and generating a second differential power gain using the second switch capacitor sub-circuit operating at the second operating frequency.

18. The method of claim 17, further comprising simultaneously performing the pulse width modulation dimming and the visible light communication, wherein the pulse width modulation dimming is performed using the first differential power gain, and wherein the visible light communication is performed using the second differential power gain.

19. The method of claim 15, further comprising using the differential power gain to maintain a constant level of output direct current, while a duty cycle of the illumination device is altered.

20. A lighting system, comprising:
   a power source;
   an illumination device;
   an electronic driver configured to perform at least one of a pulse width modulation dimming and a visible light communication using the illumination device, wherein the electronic driver comprises:
      a power converter configured to illuminate the illumination device;
      a switch capacitor circuit configured to:
         generate a differential power gain; and
         perform at least one of the pulse width modulation dimming and the visible light communication using the illumination device based on the differential power gain.

* * * * *